United States Patent [19]
Bevacqua

[11] 3,808,586
[45] Apr. 30, 1974

[54] CABLE STRAIN RELIEF ASSEMBLY

[75] Inventor: Louis Albert Bevacqua, Des Plaines, Ill.

[73] Assignee: Motorola, Inc., Franklin Park, Ill.

[22] Filed: Mar. 16, 1973

[21] Appl. No.: 342,238

[52] U.S. Cl.......... 339/103 R, 174/72 A, 248/68 R
[51] Int. Cl............................................. H01r 13/58
[58] Field of Search............ 339/93, 59 L, 125, 126, 339/103; 174/65, 72 A, 135; 248/56, 68

[56] References Cited
UNITED STATES PATENTS
| | | | |
|---|---|---|---|
| 2,931,851 | 4/1960 | Sims................................. | 174/72 A |
| 2,265,360 | 12/1941 | Dessart......................... | 339/102 L X |
| 2,988,725 | 6/1961 | Vallee........................... | 339/126 RS |

Primary Examiner—Richard E. Moore
Attorney, Agent, or Firm—Vincent J. Rauner; Vincent J. Rauner

[57] ABSTRACT

A cable strain relief assembly includes a resilient plastic base portion of a predetermined shape and having predetermined dimensions, molded about a plurality of wires extending from an electronic device, such as, for example, a vehicle voltage regulator. The wires are placed in spaced parallel alignment and extend through the base portion. A snap-in projection, molded integrally with the base portion, extends from a first surface of the latter. The projection includes a neck and enlarged head portion which is received in an aperture in a flange portion of the housing of the electronic device. A cavity formed in the flange portion of the housing surrounding the aperture is similar dimensionally and in shape to the base portion so that upon snapping the head portion through the aperture to secure the strain relief assembly on the housing, the base portion is received in the cavity with the outer wall thereof being coextensive with the outer wall of the flange portion.

7 Claims, 3 Drawing Figures

PATENTED APR 30 1974 3,808,586

CABLE STRAIN RELIEF ASSEMBLY

BACKGROUND

This invention relates generally to strain relief devices for shock mounting cables or wire leads on the housing of electronic devices.

Conventionally, strain relief devices for cables or wire leads have taken the form of rubber or the like grommets or clips which are attached to a side wall of the housing of an electronic device. A bundle of cables or wires extending from the device is held in the grommet or clip to prevent damage thereto from inadvertent pulling, etc. These clips or grommets often do not provide effective shock resistant mounting of the cables or wires and sufficient protection thereof from pinching, etc., such as, for example, in the case of voltage regulators and the like electronic devices mounted in automobiles.

Other more effective types of strain relief techniques include the holding of the wires at a particular location on the housing by means of a potting compound surrounding the wires. With this technique, however, the housing of the electronic device whereat the cables are to be mounted, must often be notched to provide an area in which the potting procedure can be performed. This technique is time consuming and can be costly, and the use of potting compound can be messy if leaking occurs.

SUMMARY

Accordingly, it is a primary object of the present invention to provide a new and improved cable strain relief assembly for use with electronic apparatus mounted, for example, in automobiles and the like vehicles.

It is another object of the invention to provide a new and improved cable strain relief assembly of the above described type which is relatively simple to fabricate, yet is effective for adequately protecting the wires against shock and pinching, etc., thereof once mounted.

It is yet another object of the present invention to provide a new and improved cable strain relief assembly which is relatively low cost and simple to use.

Briefly, a preferred embodiment of the cable strain relief assembly according to the invention includes a molded plastic block or base portion in which wires or cables have been mounted. The wires pass through the block in spaced parallel alignment and are prevented from movement by the molded plastic material surrounding the wires.

From the top wall of the block which carries the wires, there extends a plastic projection which is integrally formed with the block. The projection includes a neck portion having preferably an oval shape and a head portion attached thereto. The head portion has rounded edges and a flange or rim which extends outwardly beyond the neck portion.

The plastic projection is received in an opening in a side wall extension or flange portion of the housing of the electronic device with which the strain relief assembly is used. The opening is also of an oval shape and similar dimensionally to the neck portion. The projection is snapped into the opening from the lower surface of the housing flange. The area about the opening along the lower surface is chamfered for easy insertion of the head portion of the projection thereinto. Being of resilient plastic material, the head portion is compressed until it is snapped through the opening and the outer rim of the head portion rests on the opposite surface of the shelf. The shelf or flange portion of the electronic device includes a cutout or cavity of a shape complementary to the block portion so that the lower wall surface of the block portion and lower shelf surface are flush fitting once the projection has been inserted into the opening. The strain relief assembly provides a shock resistant mounting of the cables of the electronic device and avoids pinching, etc., thereof.

DETAILED DESCRIPTION

Figure 1:
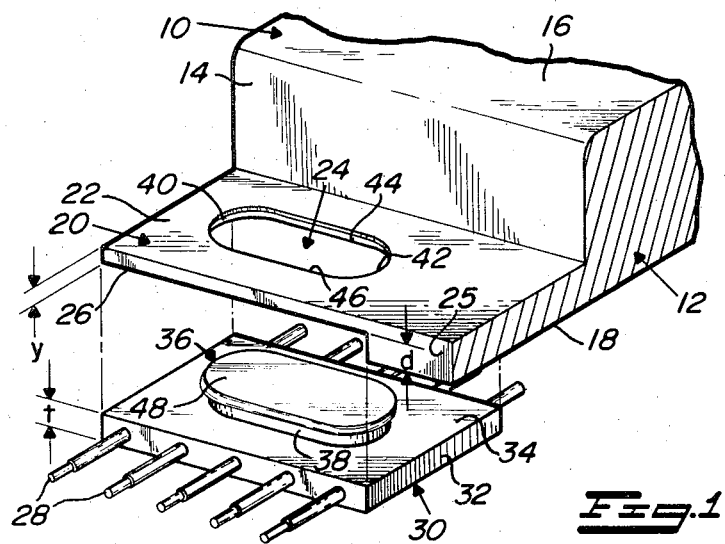
FIG. 1 is a sectional, perspective view of a cable strain relief assembly according to the invention shown prior to mounting on the housing of an electronic device.
Figure 2:
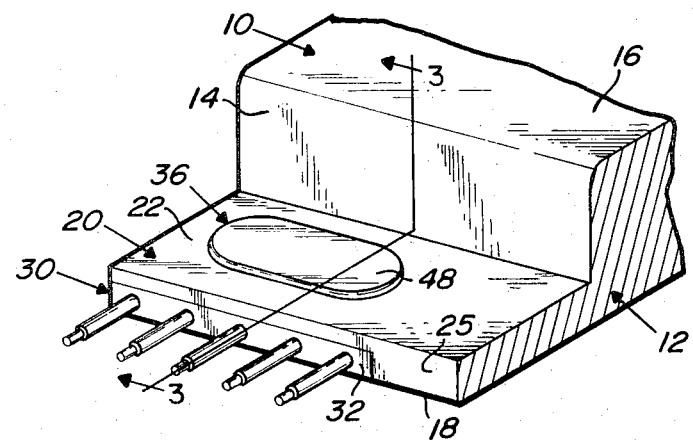
FIG. 2 is a sectional, perspective view of the cable strain relief assembly of FIG. 1 shown subsequent to mounting on the housing of an electronic device.

Referring now to the drawing in greater detail wherein like numerals have been used throughout the various views to designate similar components, there is shown the housing 10 of an electronic device, such as, for example, a voltage regulator for use in automobiles and the like vehicles. The voltage regulator housing 10 includes a main body portion 12 having side walls, such as 14, a top wall 16 and a lower or base wall 18.

A flange portion 20 formed with the main body portion of the housing extends outwardly therefrom. The flange portion 20 includes a top wall 22, side walls such as 25, and a base wall, which in the embodiment shown, is coextensive with the base wall 18 of the main body portion of the housing.

The flange portion 20 has an aperture 24 extending therethrough. A predeterminedly shaped section of the flange portion is removed from surface 18 thereof, leaving a similarly dimensioned cutout or cavity 26 surrounding the aperture 24. The cutout section can take any shape, but herein it is shown as being rectangular. The depth "$d$" of the cutout from base wall 18 likewise can be any suitable depth which is sufficient to accommodate the wires or leads, such as 28, which are to be held in the strain relief assembly according to the invention. In fact, the depth "$d$" is somewhat greater than the outer diameter of the wires 28.

The strain relief assembly 30 according to the invention includes a molded plastic base or block portion which is dimensioned complementarily to the cavity 26 in the flange portion 20 of the housing 10. In this case, the block portion is rectangular in shape also, having a thickness "$t$" equal to the depth "$d$" of cutout 26. Likewise, the length and width of the block portion is equal to the length and width of the cutout section.

Attached to the base portion 32, along a top wall 34 thereof (See FIG. 1) is a snap-in mounting projection designated generally by the numeral 36. The projection includes a neck portion 38 attached to top wall 34 of the base portion having a length "$x$" (See FIG. 3) equal to the thickness "y" of the flange portion remaining above the cutout section 26.

The neck portion 38 is shaped and dimensioned similarly to the aperture or opening 24 in the flange portion. Herein, the shape is oval having opposite curved side walls 40, 42 and opposite, substantially straight side walls 44, 46, respectively. The oval shape, as can be seen, prevents rotation of the strain relief assembly with respect to the housing 10 when the former is mounted on the latter, yet permits easy insertion of the projection through aperture 24.

Attached to neck portion 38 is an enlarged head portion 48. The head portion is larger dimensionally than neck portion 38 and aperture 24, but shaped similarly. The head portion 48 has a rounded or curved edge for easy insertion into the aperture 24 from the lower surface of the housing.

Figure 3:
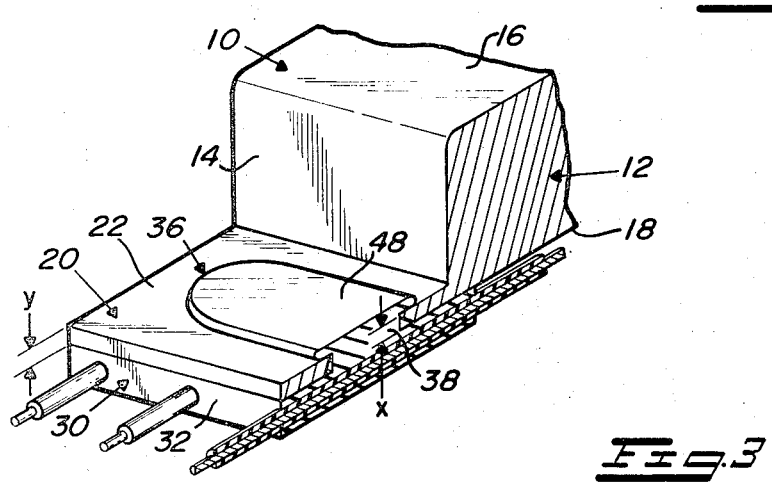
FIG. 3 is a perspective, sectional view of the cable strain relief assembly of FIG. 2 taken along the line 3—3.

As can be seen in FIG. 3, the area along the lower surface surrounding aperture 24 is chamfered, i.e. cut at an angle away from the aperture, to permit easy insertion of the head portion 48 into the aperture.

The strain relief assembly including the base portion 32 and projection 36 are formed by a well known molding technique. The strain relief assembly is molded from a resilient plastic material. The wires 28 held thereby are placed in spaced parallel alignment as shown, and the strain relief assembly is molded thereabout, sealing the wires in the plastic base portion. The resilient plastic protects the wires from shock and pinching, and maintains them in spaced relation for ease in making electrical connections when required.

In use, the enlarged head portion 48 of the strain relief assembly is inserted into aperture 24 in the specially prepared flange portion of the housing 10, from the lower wall 18 thereof, and forced through the aperture. The head portion, also being formed of resilient plastic, is compressible and snaps through the aperture easily. The rounded or curved edge of the head portion aids in the insertion thereof as well. Once through the flange portion, the outer rim or flange of the head portion extends beyond the edge of the aperture 24 and rests on the surface 22 of the flange portion surrounding the aperture to secure the strain relief to the housing 10. Neck portion 38 of the projection extends through the dimensionally similar aperture 24 and the upper surface 34 of the base portion of the strain relief assembly engages the lower surface of the flange portion whereat cavity 26 is provided.

The base portion 32 being of the same shape and thickness as the cutout section in the flange portion, fills the latter so that the outer surface of the base portion is coextensive with the bottom wall 18 of the housing, providing a flush fit therebetween.

The projection 36 of the strain relief assembly holds the latter and wires 28 securely to the housing 10 without interferring with the mounting of the elecrtrical device in position in the environment where it is to be used. With the strain relief in place, the electronic device may be flush mounted with respect to a mounting plate or the like without fear of severing or pinching the wires extending therefrom.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. A strain relief assembly for securing a plurality of electrical wires of an electronic device in shock resistant fashion, said electronic device having an outer housing including a flange portion with an aperture therethrough, and a cutout section surrounding said aperture, having a predetermined shape and depth, said strain relief assembly including in combination; a base portion formed of a resilient plastic molded about said wires to secure said wires therein, said wires extending through said base portion in spaced parallel alignment, said base portion being dimensioned similarly to said cutout for receipt therein, a projection formed with said base portion, said projection including a neck portion connected to a wall of said base portion and extending outwardly therefrom and an enlarged head portion formed at the free end of said neck portion, said neck portion being dimensioned for receipt in said aperture in the flange portion of said housing, said head portion being compressible for receipt through said opening from a first surface of said wall, the outer edge of said head portion overlapping the opposite surface of said wall portion subsequent to insertion thereof through said opening for securing said strain relief assembly on the flange portion of said housing, the base portion of said assembly being received in said cutout so that the outer wall thereof and the outer wall of said flange portion are coextensive.

2. A strain relief assembly as claimed in claim 1 wherein the first wall surface of said flange portion about said aperture is chamfered and wherein the outer edge of said head portion is rounded for cooperation with said chamfered wall surface for easy insertion of said enlarged head portion through said aperture.

3. A strain relief assembly as claimed in claim 1 wherein the neck portion thereof is oval in shape having curved first and second opposite side walls and substantially straight third and fourth opposite side walls joining said first and second walls, to prevent rotation of said strain relief assembly with respect to said flange portion.

4. For use with an electronic device from which a plurality of electrical wires emanates, having an outer housing including a main body portion and a flange portion extending outwardly therefrom, one wall surface of the flange portion being coextensive with a wall of the main body portion of said housing, said flange portion having a section of a predetermined shape and thickness removed therefrom to form a cavity in said one wall surface and an aperture extending through said flange portion within the cavity, a strain relief assembly for mounting said wires in shock resistant fashion, including in combination; a base portion formed of a resilient plastic material and molded about said plurality of wires to secure the wires therein, said base portion being dimensioned similarly to said cavity for receipt therein, a projection extending from a first surface of said base portion, said projection including a neck portion and an enlarged head portion formed at the free end of said neck portion, said neck portion being dimensioned for receipt in said aperture in the flange portion of said housing, said enlarged head portion being compressible for receipt through said aperture from the surface thereof wherein said cavity is formed, the outer edge of said head portion overlapping the opposite surface of said flange portion subsequent to insertion thereof through said aperture for securing said strain relief assembly on the flange portion of said housing, the base portion of said strain relief assembly being received in said cavity so that the outer wall thereof and said one wall surface of said housing are coextensive.

5. A strain relief assembly as claimed in claim 4 wherein said base portion and projection are integrally molded of a resilient plastic material.

6. A strain relief assembly as claimed in claim 4 wherein the area about said aperture in said flange portion within said cavity is chamfered and wherein the edge of said enlarged head portion of said projection is curved and smooth for easy insertion of said head portion into said aperture.

7. A strain relief assembly as claimed in claim 4 wherein said wires extend through said base portion in a predetermined direction and in spaced parallel alignment with respect to each other.

* * * * *

UNITED STATES PATENT OFFICE
CERTIFICATE OF CORRECTION

Patent No. 3,808,586        Dated April 30, 1974

Inventor(s) Louis Albert Bevacqua

It is certified that error appears in the above-identified patent and that said Letters Patent are hereby corrected as shown below:

Claim 1, column 4

Line 7 after "portion" insert --having first and opposite wall surfaces--.

Line 11 after "portion" insert --having an outer wall and--.

Line 17 change "a" to --the outer--.

Line 23 change "a first" to --the first wall--.

Line 23 change "wall" to --flange portion--.

Line 24 after "opposite" insert --wall--.

Line 25 change "wall" to --flange--.

Line 29 change "outer wall" second occurrence to --first wall surface--.

Signed and Sealed this second Day of September 1975

[SEAL]

Attest:

RUTH C. MASON
Attesting Officer

C. MARSHALL DANN
Commissioner of Patents and Trademarks